US012104331B2

(12) United States Patent
Rodrigues et al.

(10) Patent No.: US 12,104,331 B2
(45) Date of Patent: Oct. 1, 2024

(54) SABORAGE-RESISTANT SWITCH DEVICE FOR MOVING RAILROAD SWITCH POINTS

(71) Applicant: Mona Beaman, Thornton, TX (US)

(72) Inventors: Dilson dos Santos Rodrigues, Hewitt, TX (US); Donald Coy Beaman, Thornton, TX (US)

( * ) Notice: Subject to any disclaimer, the term of this patent is extended or adjusted under 35 U.S.C. 154(b) by 435 days.

(21) Appl. No.: 17/063,717

(22) Filed: Oct. 5, 2020

(65) Prior Publication Data

US 2021/0025115 A1 Jan. 28, 2021

Related U.S. Application Data

(63) Continuation-in-part of application No. 15/499,890, filed on Apr. 28, 2017, now Pat. No. 10,794,008, which is a continuation-in-part of application No. 15/262,908, filed on Sep. 12, 2016, now abandoned.

(51) Int. Cl.
*E01B 7/00* (2006.01)
*F15B 11/08* (2006.01)
*F15B 19/00* (2006.01)

(52) U.S. Cl.
CPC ................ *E01B 7/00* (2013.01); *F15B 11/08* (2013.01); *F15B 19/00* (2013.01); *F15B 2211/6336* (2013.01)

(58) Field of Classification Search
CPC .. E01B 7/00; F15B 11/08; F15B 19/00; F15B 2211/6336; B61L 5/02; B61L 5/10; B61L 5/045; B61L 5/04
See application file for complete search history.

(56) References Cited

U.S. PATENT DOCUMENTS 770,305 A * 9/1904 O'Brien .................... B61L 5/02 246/417
5,375,796 A * 12/1994 Turner ...................... B61L 5/04 246/393
6,056,244 A * 5/2000 Durchschlag ........... B61L 5/045 246/258
2007/0084973 A1* 4/2007 Click ........................ B61L 5/02 246/452
2011/0049308 A1* 3/2011 Beaman .................... B61L 5/04 246/258

FOREIGN PATENT DOCUMENTS

EP 480303 A * 4/1992 ................ B61L 5/04
GB 2405659 A * 3/2005 ................ B61L 5/02

* cited by examiner

*Primary Examiner* — Zachary L Kuhfuss
*Assistant Examiner* — Cheng Lin

(57) ABSTRACT

The switch machine disclosed uses electro-hydraulic power to move the throw rod against the resistance of redundant mechanical springs and the switch point, for half of its stroke. Once the switch points have moved past mid-stroke the spring force in the machine is released and assists in the closure of the switch points against the stock rail. All hydraulic force is removed when the power unit is turned off. The redundant spring assembly holds the switch points firmly against the stock rail with 2000 lbs of holding force. This machine can be described as a power operated spring switch.

7 Claims, 4 Drawing Sheets

SABORAGE-RESISTANT SWITCH DEVICE FOR MOVING RAILROAD SWITCH POINTS

The present application is a Continuation in Part of and claims priority from pending U.S. patent application Ser. No. 15/499,890 filed on Apr. 8, 2017 by common inventor Dilson dos Santos Rodrigues, entitled ELECTRIC-HYDRAULIC RAILWAY SWITCH DEVICE FOR MOVING RAILROAD SWITCH POINTS, which is a Continuation in Part of claims priority from U.S. patent application Ser. No. 15/262,908 filed on Sep. 12, 2016, by common inventor Dilson dos Santos Rodrigues, entitled RAILWAY SWITCH DEVICE FOR MOVING RAILROAD SWITCH POINTS, both of which are incorporated by reference in their entirety. Further, the present application is related to and claims priority from U.S. Provisional Patent Application No. 62/743,103 by common inventor Dilson dos Santos Rodrigues, and entitled ELECTRO-HYDRAULIC POWER SWITCH WITH SWCC, which is also incorporated by reference herein in its entirety.

TECHNICAL FIELD

The present invention generally relates to machines for moving switches used in the railroad industry.

BACKGROUND

Railway track switches are mechanical devices that can change a train's course from one track to another. A typical rail track "junction" has two tracks that merge together or form a "crossover" to lead a train from one track to another. And each track junction usually has what is referred to as a straight track as well as what is called a diverging track (to the left or right-hand side of the straight track). Based on the setup, the tracks are typically called a "left diverging track" or a "right diverging track."

The rail tracks that form a junction have three types of rails that form the whole junction. The first is the stock rail, which is a permanent, non-moving rail that extends from the junction to the length of the track. The second type of rail is an intermediary rail, also known as a "closure rail", which is also stationary (it does not move when the train's course is switched).

The closure rails form the "overlap" between two different train tracks. In a track junction comprising a straight track and a right diverging track, the closure rail of the straight track passes into the path of the right diverging track and the closure rail of the right diverging track passes into the path of the straight track. Thus, the two tracks merge to form a common track. The actual track switching is achieved with the third track, known as a "switch rail", which is movable. The switch rail has tapered ends, and the ends simultaneously merge with one of the straight and one of the diverging tracks to form a single continuous track on which a train may safely travel.

In operation, the switch rails are moved using a track switching machine. The machine is usually hydraulically or pneumatically operated. Typically, the machine has a point rod (or "switch rod") that leads to the movable switch rails. When the tracks needs to be aligned between the straight track and a diverging track, the switch rod is moved in a lateral direction to achieve a shift of the switch rails. This lateral shift, when completed, creates a continuous track on which a train may travel.

Since Sep. 11, 2001 terrorism and sabotage have become front-of-mind for many Americans. One vulnerability to commerce and peaceful existence in the USA comes in the form of every railroad junction. Practically none are monitored by camera, and practically none have any mechanism in place to detect a cut or broken point rod. So, a person with evil intent could, without little concern of being caught, cut or otherwise sabotage key junctions (especially in metro areas)—thus derailing trains full of commuters or hazardous materials in highly-populated areas.

Unfortunately, existing hydraulic switches do not have the ability to detect sabotaged or otherwise cut switch point throw rods. This means that existing switch machines may move switch points too slowly, leading to derailment which can cause millions of dollars of damage to goods being transported, or physical harm to operators or even the general public.

In view of the foregoing, there is need for a hydraulic railroad switch device that is able to quickly and reliably move railroad switch points and both detect and report likely sabotage. The present invention provides such as device.

Further limitations and disadvantages of conventional and traditional approaches will become apparent to one of skill in the art through comparison of described systems with some aspects of the present disclosure, as set forth in the remainder of the present application and with reference to the drawings.

DISCUSSION OF RELATED ART

State-of-the-art track switching machines are typically controlled by an operator who sits at a control room located at a remote location from the tracks. The machines also have a manual operation lever that can be actuated for manual shift of the tracks in case of a hydraulic or pneumatic circuit failure.

US2011049308A1 to Beaman et al. is related to a hydraulically operated track switching machine. Beaman et al. consists of a switch connector rod connected to switch rails of a railway track, and the movement of the switch rails is effected by the reciprocating movement of the switch connector rod. The device also has a target that signals the current status (position) of the tracks. According to Beaman et al., the switch rails are moved to the stock rails by the spring force produced from the springs present in the track switching machine.

U.S. Pat. No. 4,213,588A to Bowles is related to a track switch machine which is fluidically operated by hydraulic or pneumatic means. The machine has lock members that can lock the rail points in two extreme positions. In Bowles, spring action is used for moving rail points from one position to another. However, the U.S. Pat. No. 4,213,588A does not disclose a rapid articulation of switch points.

Various embodiments of the present invention target the above-mentioned deficiencies, and has other benefits readily apparent to those of ordinary skill in the railroad arts.

SUMMARY OF THE INVENTION

A hydraulic railroad switch device for moving railroad switch points are provided

- a throw time of less than half a second, and more throw force and durability. substantially as shown in, and/or described in connection with, at least one of the figures, as set forth more completely in the claims.

The switch machine disclosed uses electro-hydraulic power to move the throw rod against the resistance of redundant mechanical springs and the switch point, for half of its stroke. Once the switch points have moved past mid-stroke the spring force in the machine is released and assists in the closure of the switch points against the stock rail. All hydraulic force is removed when the power unit is turned off. The redundant spring assembly holds the switch points firmly against the stock rail with 2000 lbs of holding force. This machine can be described as a power operated spring switch. These and other features and advantages of the present disclosure may be appreciated by a review of the following detailed description of the present disclosure, along with the accompanying figures in which like reference numerals refer to like parts throughout.

BRIEF DESCRIPTION OF DRAWINGS

The accompanying drawings illustrate the various embodiments of systems, methods, and other aspects of the disclosure. Any person with ordinary skills in the art will appreciate that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa. Furthermore, the elements may not be drawn to scale.

Various embodiments will hereinafter be described in accordance with the appended drawings, which are provided to illustrate and not to limit the scope in any manner, wherein similar designations denote similar elements, and in which.

DETAILED DESCRIPTION OF A PREFERRED EMBODIMENT

Figure 1:
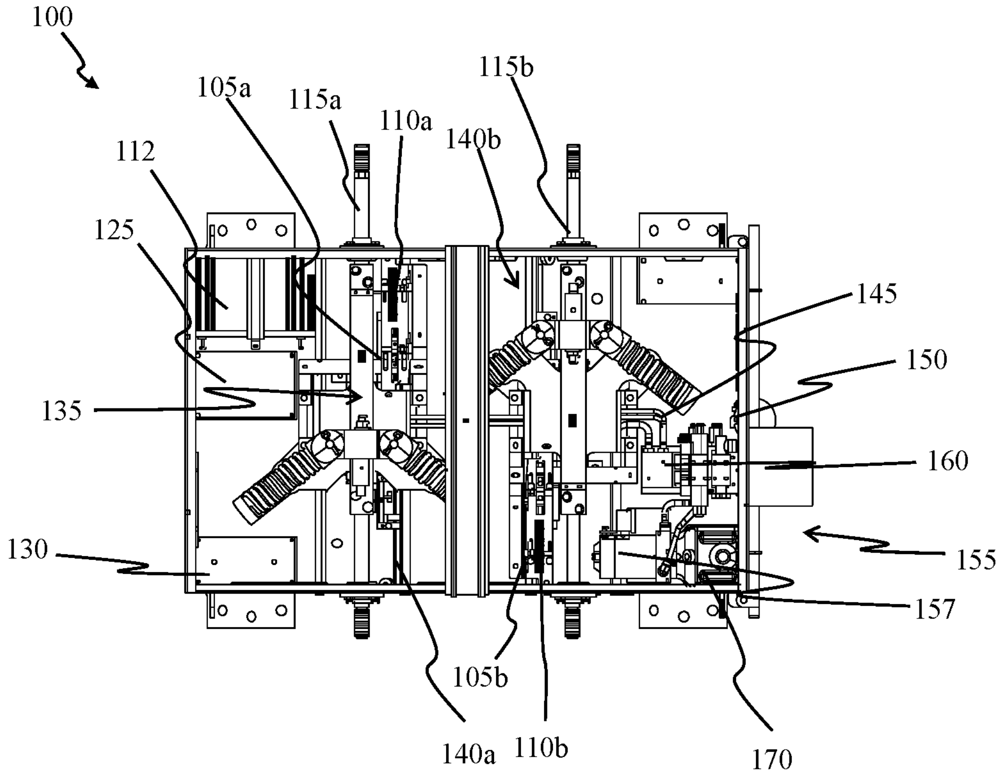
FIG. 1 illustrates a first top-down interior view of an inventive switch machine.

The present disclosure is best understood with reference to the detailed figures and description set forth herein. Various embodiments are discussed below with reference to the figures. However, those skilled in the art will readily appreciate that the detailed descriptions provided herein with respect to the figures are merely for explanatory purposes, as the methods and systems may extend beyond the described embodiments. For instance, the teachings presented and the needs of a particular application may yield multiple alternative and suitable approaches to implement the functionality of any detail described herein. Therefore, any approach may extend beyond the particular implementation choices in the following embodiments described and shown.

References to "one embodiment", "at least one embodiment", "an embodiment", "one example", "an example", "for example", and so on indicate that the embodiment(s) or example(s) may include a particular feature, structure, characteristic, property, element, or limitation, but not every embodiment or example necessarily includes that particular feature, structure, characteristic, property, element, or limitation. Furthermore, repeated use of the phrase "in an embodiment" does not necessarily refer to the same embodiment.

Unless defined otherwise, all technical and scientific terms used herein have the same meaning as commonly understood by one of ordinary skill in the art to which this invention belongs. Although any method and material similar or equivalent to those described herein can also be used in the practice or testing of the present invention, the preferred methods and materials are described and are incorporated within the scope of the claims. All publications, patents, and patent applications mentioned herein are incorporated in their entirety.

It is also noted that as used herein and in the appended claims, the singular forms "a", "and", and "the" include plural referents unless the context clearly dictates otherwise. In the claims, the terms "first", "second", and so forth are to be interpreted merely as ordinal designations they shall not be limited in themselves. Furthermore, the use of exclusive terminology such as "solely", "only" and the like in connection with the recitation of any claim element is contemplated. It is also contemplated that any element indicated to be optional herein may be specifically excluded from a given claim by way of a "negative" limitation. Finally, it is contemplated that any optional feature of the inventive variation(s) described herein may be set forth and claimed independently or in combination with any one or more of the features described herein.

All references, including publications, patent applications, and patents cited herein are hereby incorporated by reference to the same extent as if each reference were individually and specifically indicated to be incorporated by reference and were set forth in its entirety herein.

The recitation of ranges of values herein are merely intended to serve as a shorthand method of referring individually to each separate value falling within the range, unless otherwise indicated herein, and each separate value is incorporated into the specification as if it were individually recited herein.

INTRODUCTION

The present invention describes an improved railroad switch device (100), presently embodied as an electro-hydraulic power switch machine (EHPS) from Advanced Rail Systems® of Waco, Texas, with a standard switch circuit controller (SWCC) as a mainline power switch assembly. This assembly is for use in mainline railroad applications, including Centralized Traffic Control (CTC) and other signal systems with speeds up to 79 MPH (or foreseeably higher). The use of this machine in conjunction with a SWCC will provide a safer power switch assembly than what is in operation today. In addition to providing a safer switch assembly it may provide lower capital cost and operational cost to railroads.

Traditional mainline power switch machines are electro-mechanical devices that have a switch movement, switch point locking movement, and a point detection device in one assembly. Also used on the mainline in CTC applications is a traditional mechanical spring switch device.

Starting in 2003, Class one railroads started to deploy power assisted switch systems on mainline routes in "dark territory". These systems used the first version of electro-hydraulic switch machines in conjunction with a switch circuit controller on a mainline application, where speeds were greater than 20 MPH but less than 49 MPH, and not part of a signal system (dark territory). This arrangement worked fine for about fifteen years with no safety related issues attributed to the switch machine assembly. The switch machine assembly worked well but was only considered to provide equal safety functionality compared to a traditional mainline power switch.

Advances in EHPS

The present invention provides a significant breakthrough in switch machine technology that is safer than a traditional mainline power switch machine when used with a switch circuit controller.

Traditional Mainline Switch Machine

Traditional mainline switch machines use a switch and lock movement for moving the switch points. The point detection is accomplished by utilizing an adjustable cam bar that follows the switch point movement. When the switch is called to move from one position to the other, the first thing that takes place is the release of the lock rod, then the switch points move from one position to the other, then the lock rod is positioned to lock the point. If the point locks and the switch points are in the correct position from the stock rail, the point detection rod will allow an indication the switch correctly moved.

As the switch machine sits at rest, it is mechanically locked and the switch point detection system provides a position and switch locked indication to a control processor or an electro-mechanical relay. The mechanical force being applied to the switch points holding them against the stock rail is derived from the mechanical drive train of the power switch machine. The average holding force for the mechanical drive train is less than 400 pounds of force. These machines rely upon the lock rod to ensure the switch points are held in the correct position as trains traverse the switch points. The points can open against the mechanical holding force, but the lock rod will prevent the points from opening to an unsafe distance from the stock rail.

The lock rod that locks the switch point in position is allowed to have a tolerance of ¼ of an inch (by Federal Railway Administration (FRA) rules). This means the point can gap open under a train, but only by a limited amount. The point detector rod will remove the indication of correspondence if the point gaps open ¼ of an inch (again, by FRA rules). Many railroads use tighter tolerances for lock rods and point detector rods, but it does not change the holding force for holding the switch point against the stock rail.

Specific Device

FIG. 1 illustrates a first top-down interior view of an inventive switch machine. The invention includes a switch machine having a battery (112), lock spring sets (120, 122, and 126, 128), manual operation sensor (150), a hydraulic power unit (155) and a hydraulic manifold (160), two position sensors (105*a*) proximate to a first point rod (110*a*), a centering device (140*a*, 140*b*), an auxiliary electronic tray (130), a bearing guide bracket (135), an electronic tray (125), and two position sensors (105*b*) at a second point rod (110*b*).

Figure 2:
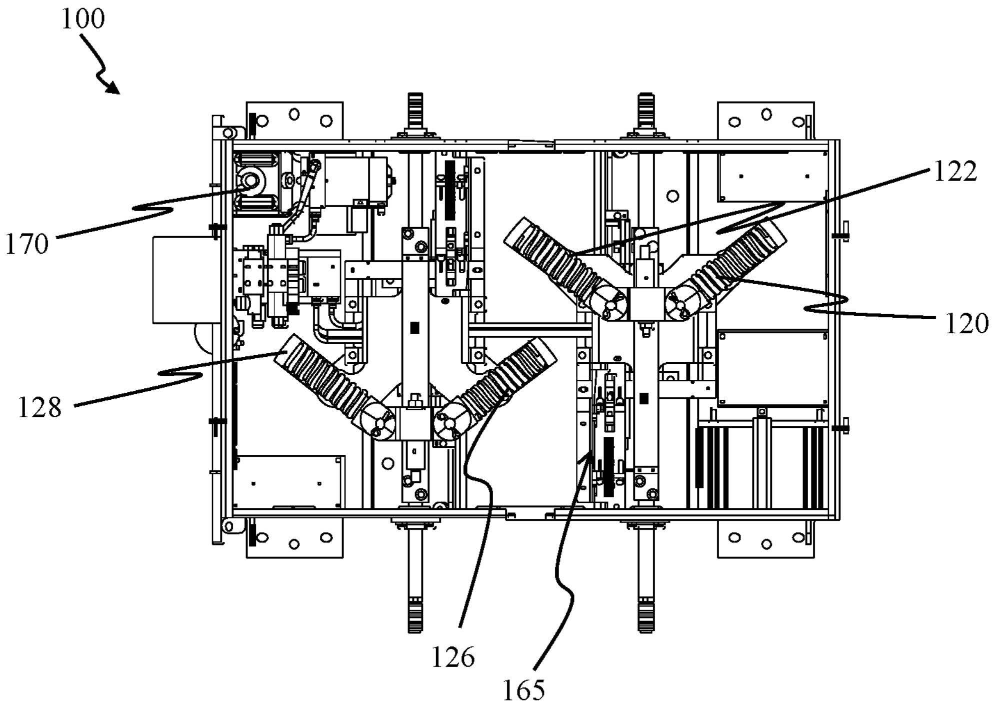
FIG. 2 illustrates a second top-down interior view of an inventive switch machine to feature a switch point position and holding force detection assembly.

FIG. 2 illustrates a second top-down interior view of an inventive switch machine to feature a switch point position and holding force detection assembly (165). In one embodiment, the switch machine may be controlled through at least one of: a local programmable logic controller (PLC), or a remote PLC. The PLC is used to control and monitor input signals from various input sensors, which report events and conditions occurring in a controlled process such as power on/off or emergency cut-off of the switch machine. The switch machine may be activated with direct current (DC) (typically batteries), or alternating current (AC). However, electronic components of the switch machine (100), including the PLC, typically operate at much lower DC voltages, typically 3.3-5 volts. The power unit supplies the hydraulic power to the hydraulic power unit (155) to move the point rod (110*a* or 110*b*). The hydraulic power unit (155) may be a DC power source such as a battery or a capacitor, or an AC power source.

In an embodiment, the PLC(s) used in the present invention is a digital computer (including a processor and a memory) used for automation of electromechanical processes, such as those commonly used to control machinery on factory assembly lines, HVAC systems, or industrial/commercial light fixtures. The PLCs preferably have multiple inputs and output arrangements, extended temperature ranges, immunity to electrical noise, and resistance to vibration and impact, among others. Additionally, programs to control machine operation are typically stored in battery backup or non-volatile memory.

Although not shown but described in the referenced and incorporated documents, the switch machine preferably includes a switch lid, front foot, switch housing sidewall that encompasses all four sides of the switch machine, hand pump operator, hand operation direction lever. The switch lid, switch housing sidewall, and switch bottom comprise the environmental housing. From the switch sidewall housing protrudes the point rods (110*a*. 110*b*), front foot, hand pump operator, hand operation direction lever, and optional rear target. Thus, FIG. 1 illustrates the top-down view the inventive switch machine with the lid of its environmental housing removed.

Alternatively or additionally, electronic point rod position indicators may be incorporated into the invention. For example, an alternative point rod position indicator could be a colored light or lights.

Typically, the hydraulic power unit (155) includes: a DC motor (157) of preferably 12 Volts (at negative and positive poles) for intermittent heavy-duty cycling (a preferred motor current at 750 PSI and over 2.2 gallon per minute is rated 154 Amps, or optionally 250 Amps), a hydraulic pump with fixed displacement, a plastic, synthetic, or Teflon®-coated (interior) metal oil reservoir (preferably at least 1.8 liters, but optionally 2.2 liters), an externally adjustable relief valve, a check valve, a motor start solenoid for intermittent heavy-duty cycle (preferably rated at 250 Amps), and a reservoir breather, for example.

The point rods (110*a*, 110*b*) provide forward movement and reverse movement to define an operation cycle, and in time an operation period. And, the hydraulic circuit increases the operation period.

The proximity sensors (410, 412) detect the point rod's position and allow the electronics to further adjust the position of the point rod (110*a*, 110*b*).

FIGS. 1 and 2 illustrate in-situ spring assemblies formed by a first switch operation unit and a second switch operation unit. The spring assemblies each include a spring pivot bar, a plurality of compressed springs (120-128), a bearing guide bracket (135), a hydraulic cylinder (170), two front cylinder rods, a flange & bushing, a front rod bar, a top rod bracket, a cam roller bearing, and a center bracket. Each front cylinder rod in one embodiment is coupled to the point rod (110*a*, 110*b*), while in an alternative embodiment are the point rods (110*a*, 110*b*). The cam roller bearing installed under the top rod bracket runs inside the centering bracket roller tray to prevent rod rotation caused by external forces.

After the point rods (110*a*, 110*b*) move the rail points from one position to another, the hydraulic power is turned off and the rail points are kept closed by the spring force. If one train runs through the switch, the hydraulic cylinder (170) will completely move to the other position without damaging the components; there is no hydraulic restriction to the movement.

Although not shown in detail, each connection rod assembly includes a the hydraulic cylinder (170) and a running bearing. A cam roller bearing is preferably under the top rod bracket that runs inside a bearing track to prevent rod rotation. This also allows the use of electronic proximity sensors (410, 412) to detect a rod position with high precision.

Figure 3:
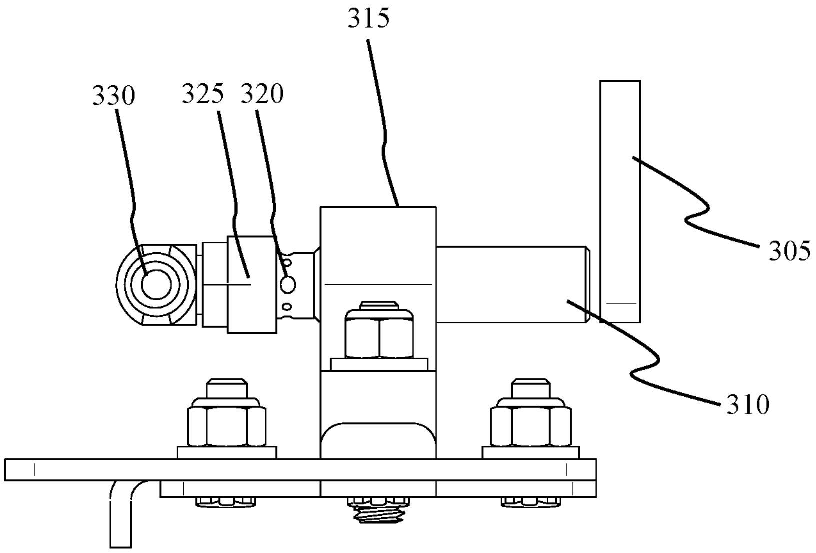
FIG. 3 illustrates a front view of the detection assembly.

FIG. 3 illustrates a front view of the detection assembly including a quick disconnect socket (330), a lock nut (325), a sensor (LED indicator light) (320), a sensor support housing (315), and a sensor (310) proximate to a separately mounted target (305).

Figure 4:
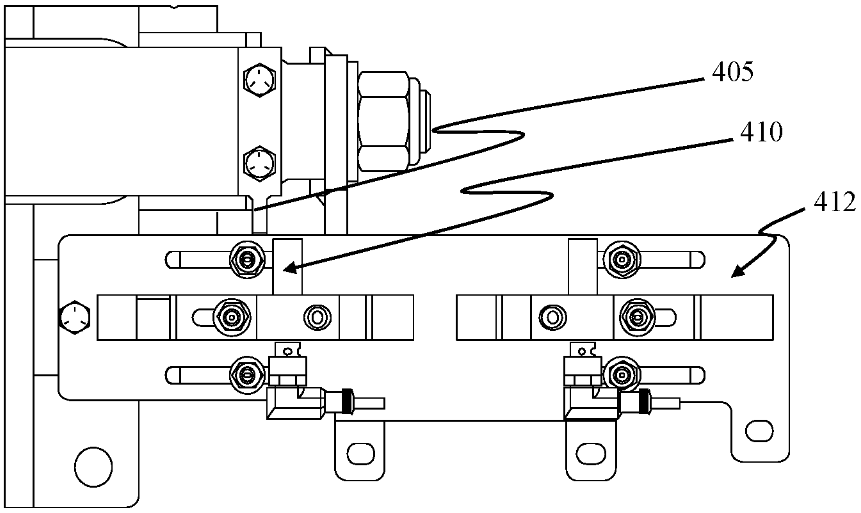
FIG. 4 illustrates a top-down view of the detection assembly.

Similarly, FIG. 4 illustrates a top-down view of the detection assembly, including a target out of a proximity sensor detection zone (405), a proximity sensor (410), and two proximity sensors (105*a*, 105*b*) that are positioned to for a predetermined throw distance.

Preferably, each cylinder rod is associated with a center stroke unit having the proximity sensor assembly with sensors thereon. A block clamp holds the plurality of proximity sensors (410, 412) in position. The plurality of proximity sensors (410, 412) are installed in parallel to the switch rod. A sensor target installed at the top rod bracket activates each proximity sensor (410, 412) at the desired reverse (410) and forward (412) positions. Various components of the proximity sensor assembly are shown but not discussed because they are known and readily apparent to those of skill in the railroad art.

Figure 5:
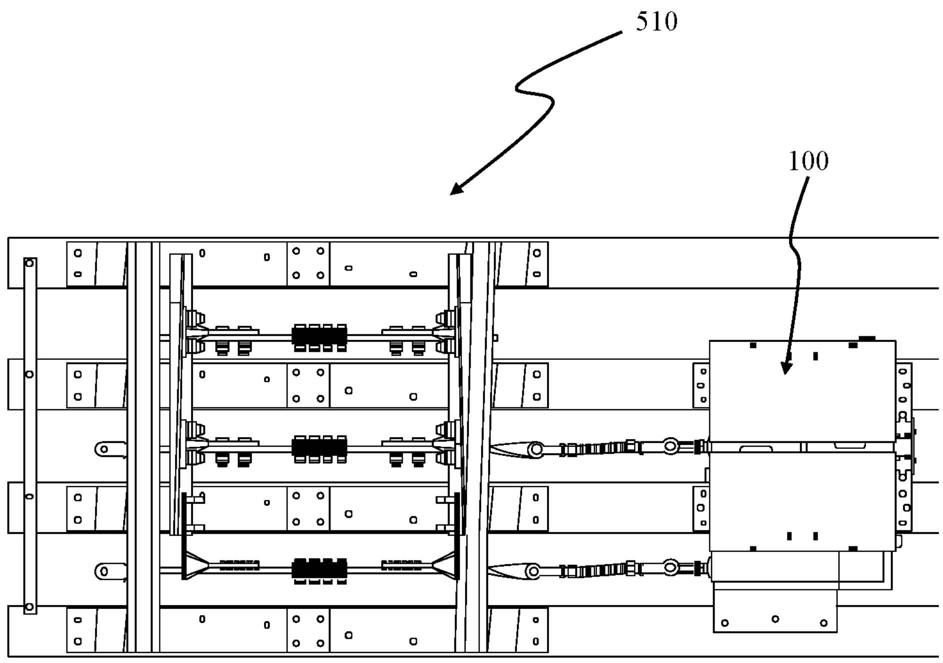
FIG. 5 illustrates the inventive switch machine coupled to a railroad junction.

FIG. 5 illustrates the inventive switch machine (100) coupled to a railroad junction (510).

Inventive Improvements Over The Prior Art

The machine was designed to ensure that if the switch point holding force is lost, the spring force of the assembly will push the switch point position target away from the sensor (410, 412). The throwing stroke of the machine is 6.5 inches to provide a full 0.875 inches of overstroke capability on both the normal and reverse point position. It uses two PNP (positive-negative-positive) high quality, focused beam proximity sensors on one rod and two NPN (negative-positive-negative) high quality, focused beam proximity sensors on the other rod assembly. The switch point position target is specifically sized to provide fine adjustments for detection of the switch points opening to meet mainline requirements. When in standard operation one rod provides +12DC position indications and the other rod provides −12DC position indications. The indications are monitored by the control system logic (either by the switch control processor or the vital controller for the signal system or both) to ensure that no proximity sensor has failed. If an input from the proximity sensor is shorted the logic of the control software will detect this and cause the system to show out of correspondence.

Accordingly, The present inventive switch machine is the latest in electro-hydraulic power switch machines. It is designed with a, spring over center operating arrangement, meaning the throw mechanism is pushing against resistance of switch point holding springs as the switch movement is started. The throw rod movement compresses the holding springs until it reaches center position, and then the over-center spring force assists with the closing of the switch points. Once the points are closed to the stock rail, the motor is shut off and the mechanical spring force holds the switch point to the stock rail.

The present invention has several features that sets it apart from other electro-hydraulic power switch machines. It uses two spring assemblies instead of one spring to provide redundancy of holding force and equalized operation. It provides a combined 3200 lbs of constant holding force against the stock rail. It has a maximum throwing stroke of 6 inches. It utilizes two focused, high-quality proximity sensors for monitoring the position of the throw rod and two for monitoring the position of the redundant holding force rod. It uses a solid-state switch controller in the switch machine for switch control and to operate the switch machine movement.

In a mainline application for the present invention, it is crucial that a switch circuit controller be added to the assembly. This device provides vital switch point position information to the vital controller at the control point. This method for vitally checking switch point position is well accepted and fits the invention's operation well.

The present invention uses proximity sensors (410) to monitor a small metal target fixed to the throw mechanism and the redundant spring holding force assembly. Because the present invention is a spring over center design, when the machine is adjusted for the stroke of the switch points it is applied to, typically 4.75 inches, it leaves 0.6125 inches of stroke available on the throw mechanism for each direction of throw.

The proximity sensors (410, 412) for the throw mechanism provide a positive 12 VDC output when the throw rod position target is in its field of view. The proximity sensors (410, 412) used in the present invention are designed to focus their field of view to a point. This is significantly different from other EHPS machines that use proximity sensors (410, 412) with an expanding field of view, typically a 45-degree spread.

The output from the proximity sensor (410, 412) for the throw rod position indication is routed to the Switch Machine Controller (SMC), a conditioned, positive output from the SMC is routed through the SWCC contacts for the corresponding switch point position. By doing this, the switch machine assembly will be providing a vital switch point position indication to the signal system.

This arrangement also provides a "holding force applied" indication. This is one major reason this arrangement is safer than the traditional mainline switch machines utilized today. If the holding force is lost with a traditional mainline machine, it cannot be detected unless it is called to be moved from its current position. With the present invention and SWCC arrangement, loss of holding force is detected immediately because the throw rod target will move past the proximity sensor (410, 412). When this happens, the 12 VDC output is lost, triggering an "out of correspondence" indication to the signal system.

Reason for the Need to Check Holding Force

Today we must be concerned with terrorism and vandalism. If a terrorist wants to create havoc with the Nation's rail network, all they need to do is go to a mainline control point, cut the throw rod and the lock rod and leave the point detector rod alone. This removes all holding force for the switch machine but the point will stay in correspondence providing an indication it is safe to proceed. When the next mainline facing point move takes place over the switch, the signal will be green. The switch point will not stay next to the stock rail for very long and the derailment that occurs will be at maximum speed.

What happens if the Throw rod is cut or breaks while the train in traversing the switch? When a traditional mainline locking switch machine throw rod breaks or the bear paw breaks while a train is traversing the switch, the switch points are held in position by the lock rod. The present switch machine has an added a secondary rod to connect to the switch point layout in the same crib space as the lock rod for traditional mainline switch machines. The present invention's secondary rod connects to the number 1 rod of the layout with a 1⅛th clevis pin. Inside the machine the rod is attached to a spring over center holding force assembly. The spring holding force assembly provides 1200 LBS of holding force. The rod assembly has rod position indication targets so the processor can monitor the position of the redundant holding force rod.

Improvement in Safety

If any rod on the switch machine is cut at any time; throw rod, redundant holding force rod or point detector rod, the following will happen

- the throw rod, holding force springs will extend to the maximum stroke distance pushing the throw rod target past the proximity sensor (410, 412)
- the 12 VDC output will be lost and an unsafe state will be recognized
- the redundant holding force rod, the holding force spring will extend to the maximum stroke distance pushing the redundant holding force rod target past the proximity sensor (410, 412)
- the 12 VDC output will be lost and an unsafe state will be recognized.
- the SWCC rod is cut, the centering springs in the SWCC will open the switch point position circuits and an unsafe state will be recognized.

The present invention provides additional safety benefits to the railroads in the same manner as the other spring over center switch machine designs that have been successfully deployed in dark territory mainline applications.

A spring over center electro-hydraulic switch machine is trailable; when trailed through, the switch points do not return to the same position after the wheel flange pass through the turnout. The switch points will close to the opposite side stock rail and hold it there with maximum spring holding force.

1. The invention is not damaged if trailed through up to 40 mph.
2. It does not cause a derailment by having the wheel flange climb the switch point.
3. No one on the locomotive is hurt when the switch is run through When a traditional mainline locking machine is run through 1. the switch machine is damaged,
2. the track may be damaged,
3. the wheel can climb the point, cause a derailment and the operator can get hurt.

Other benefits the invention are as follows:

1. 12 VDC operation for the switch machine
   a. Reduces the size of the location battery backup
   b. Provides longer operation time on battery back up
2. Constant holding force of the switch point with redundant mechanical springs on the throw rod providing 2000 lbs of holding force.
3. Constant 1200 LBS of redundant spring holding force applied by the redundant holding force rod.
4. Faster throw time, 1.2 seconds
5. Throw force is double traditional switch machines (handles longer turnouts)
6. Soft point closure with motor shut off sequence starting with ¼ inch prior to point closure. Mechanical springs finish last ¼ inch of stroke
7. Maintenance free design, no grease in the machine.

CONCLUSION

Being able to detect the loss of holding force is a critical item that has not been in a safety fault tree for railway switch machines. The threat of terrorism and vandalism is real, and we should, as railroad safety professionals, allow the testing of the inventive switch power operated spring switch with a SWCC, on mainline railroad in signalized territory. We are stewards of a tradition of safety that must evolve with developments in our industry.

It will be apparent to those skilled in the art that various modifications and variations can be made to the present invention without departing from the spirit and scope of the invention. There is no intention to limit the invention to the specific form or forms enclosed. On the contrary, the intention is to cover all modifications, alternative constructions, and equivalents falling within the spirit and scope of the invention, as defined in the appended claims. No language in the specification should be construed as indicating any non-claimed element as essential to the practice of the invention. Thus, it is intended that the present invention covers the modifications and variations of this invention, provided they are within the scope of the appended claims and their equivalents.

What is claimed is:

1. A railroad switch device for moving railroad switch points, the railroad switch device comprising:

a hydraulic power unit comprising:

a hydraulic manifold, wherein the hydraulic manifold is adapted to move fluid as needed to activate movement of a first switch operation unit and a second switch operation unit as directed by a control system, wherein the first switch operation unit comprises a first spring unit and the second switch operation unit comprises a second spring unit, where each spring unit has two springs, wherein the two spring units produce a continuous thrust force for holding the railroad switch points closed in forward position and reverse position; and a hydraulic cylinder to provide forward movement and reverse movement for the railroad switch points, wherein the hydraulic manifold, and the hydraulic cylinder are fluidly coupled to define a hydraulic circuit, wherein the hydraulic circuit controls an operation period of the railroad switch device, and wherein the hydraulic power unit is coupled to a first point rod position indicator and a second point rod position indicator, at least one first proximity sensor to detect a point rod position for a first point rod;

at least one second proximity sensor to detect a point rod position for a second point rod; and a power unit to supply the hydraulic power to the hydraulic power unit for moving the first point rod and the second point rod, wherein the first point rod and the second point rod provide forward movement and reverse movement to define an operation cycle in the railroad switch device.

2. The railroad switch device according to claim 1, wherein the two spring units provide a combined 3200 lbs of constant holding force against a stock rail.

3. The railroad switch device according to claim 1, wherein the first spring unit and the second spring unit independently provide a holding force for the railroad switch points.

4. The railroad switch device according to claim 1 wherein the power unit is at least one of a DC battery source, an AC power source, or combination thereof.

5. The railroad switch device according to claim 1 wherein the control system is one of a programmable logic controller (PLC) and a digital computer, wherein the control system is used to control and monitor input signals from the at least one first proximity sensor and the at least one second proximity sensor and report events and conditions occurring in a controlled process of the railroad switch device.

6. The railroad switch device according to claim 1, wherein the hydraulic power is turned off and the railroad switch points are kept closed by a spring force upon detecting the first point rod and the second point rod move to the railroad switch points from one position to another.

7. A method of handling an operation of railroad switch points, comprising:

activating movement of a first switch operation unit and a second switch operation unit as directed by a control system and a hydraulic manifold, wherein the first switch operation unit comprises a first spring unit and the second switch operation unit comprises a second spring unit, where each spring unit has two springs;

producing a continuous thrust force for holding the railroad switch points closed in forward position and reverse position using the two spring units;

detecting a point rod position for a first point rod using at least one first proximity sensor;

detecting a point rod position for a second point rod using at least one second proximity sensor, wherein the at least one first proximity sensor and the at least one second proximity sensor are coupled with the first switch operation unit and the second switch operation unit respectively; and supplying a hydraulic power to a hydraulic power unit from a power unit for moving the first point rod and the second point rod, wherein the first point rod and the second point rod provide forward movement and reverse movement to define an operation cycle in the railroad switch device.

* * * * *